US006723766B1

(12) United States Patent
Hirano et al.

(10) Patent No.: US 6,723,766 B1
(45) **Date of Patent: *Apr. 20, 2004**

(54) METHOD FOR MANUFACTURING LIGNEOUS MATERIAL

(75) Inventors: Yoshihiro Hirano, Hamamatsu (JP); Ritsuo Iwata, Hamamatsu (JP); Satoshi Suzuki, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,239

(22) Filed: Jun. 9, 2000

(30) Foreign Application Priority Data

Jun. 10, 1999 (JP) .......................................... 11-164432

(51) Int. Cl.[7] .......................... C08L 97/02; C08K 5/13; C08G 18/00; C08H 5/02

(52) U.S. Cl. .......................................... 524/73; 527/401

(58) Field of Search .................... 524/72, 73; 527/401; 536/69; 521/67

(56) References Cited

U.S. PATENT DOCUMENTS

| | | | | |
|---|---|---|---|---|
| 2,417,995 A | | 3/1947 | Stamm et al. | |
| 4,804,384 A | * | 2/1989 | Rowell et al. | 8/121 |
| 5,431,868 A | * | 7/1995 | Hirano | 264/83 |
| 5,525,721 A | | 6/1996 | Ohshima et al. | |
| 5,736,218 A | * | 4/1998 | Iwata et al. | 428/207 |
| 5,777,101 A | | 7/1998 | Nelson et al. | |
| 5,851,325 A | * | 12/1998 | Terada et al. | 156/62.2 |
| 6,010,793 A | * | 1/2000 | Yoshimura et al. | 428/537.1 |
| 6,129,871 A | * | 10/2000 | Suzuki et al. | 264/51 |
| 6,146,710 A | * | 11/2000 | Symons | 427/470 |
| 6,376,582 B1 | * | 4/2002 | Iwata et al. | 524/14 |

FOREIGN PATENT DOCUMENTS

| | | | |
|---|---|---|---|
| DE | 695 19 424 | | 2/1995 |
| EP | 0 213 252 | | 3/1987 |
| EP | 0 909 618 | | 4/1999 |
| GB | 964197 | | 7/1964 |
| JP | 2075038 | * | 11/1981 |
| JP | 61066604 | * | 4/1986 |
| JP | 61171763 | | 8/1986 |
| JP | 03130104 | | 6/1991 |
| JP | 03183540 | | 8/1991 |
| JP | 04144705 | | 5/1992 |
| JP | 04166301 | | 6/1992 |
| JP | 06198610 | * | 7/1994 |
| JP | 7-9418 | | 1/1995 |
| JP | 07040314 | | 2/1995 |
| JP | 07088813 | | 4/1995 |
| JP | 07124913 | | 5/1995 |
| JP | 2500491 | | 3/1996 |
| JP | 10128711 | | 5/1998 |
| WO | WO 95/05275 | * | 2/1995 |

OTHER PUBLICATIONS

English Translation of JP 61066604 (1986).*

Machine Translation of JP 07124913 (1995).*

German Official Communication dated Dec. 10, 2001.

* cited by examiner

*Primary Examiner*—Callie Shosho
(74) *Attorney, Agent, or Firm*—Dickstein, Shapiro, Morin & Oshinsky, LLP.

(57) ABSTRACT

The present invention relates a method for manufacturing ligneous material, characterized in comprising the steps of acetylating wood elements selected from among wood pieces crushed from lumber, thin wood plates peeled from lumber, and wood fiber obtained by means of defibrating lumber, such that the degree of acetylation (weight percent gain) is 7% or greater, and preferably 7 to 18%; and binding the resultant aceylated wood elements, using a binder containing polyisocyanate. Thereby, it is possible to provide inexpensive ligneous material which exhibits only minor dimensional changes from moisture, wherein only a small amount of formaldehyde is released.

5 Claims, 2 Drawing Sheets

METHOD FOR MANUFACTURING LIGNEOUS MATERIAL

BACKGROUND OF THE INVENTION

1. Field of the Invention

The present invention relates to a method for manufacturing ligneous material by means of binding wood pieces, thin wood plates, wood fiber, and the like, using a binder.

2. Description of Related Art

Ligneous materials made by means of binding wood fiber and the like, using a binder, exhibit a superior strength, a low directional stability, and uniform quality, leading to ease in processing, and thus can provide molded products with curved surfaces, in addition to plate-shaped molded products. Hence, they are used as material for building materials, furniture, and the like. A method for manufacturing such ligneous materials is disclosed in, for example, Japanese Patent Number 2500491. The aforementioned publication discloses a molded product manufactured by means of integrating acetylated wood fiber, using a phenol resin adhesive. Additionally, the degree of acetylation of the aforementioned acetylated wood fiber is in the range of 10~30%.

However, the aforementioned molded product requires an acetylating agent, which is expensive, thus leading to increased costs, and also creates a problem in the release of formaldehyde.

The object of the present invention is to provide a method for manufacturing an inexpensive ligneous material which exhibits only minor dimensional changes from moisture, wherein only a small amount of formaldehyde is released.

SUMMARY OF THE INVENTION

The method for manufacturing ligneous material according to the present invention is characterized in comprising the steps of: acetylating wood elements selected from among wood pieces crushed from lumber, thin wood plates peeled from lumber, and wood fiber obtained by means of defibrating lumber, such that the degree of acetylation (weight percent gain) is 7% or greater, and preferably 7~18%; and binding the resultant acetylated wood elements, using a binder containing polyisocyanate.

Additionally, the method for manufacturing ligneous material according to the present invention is also characterized in comprising the steps of: acetylating a portion of wood elements selected from among wood pieces crushed from lumber, thin wood plates peeled from lumber, and wood fiber obtained by means of defibrating lumber, such that the average degree of acetylation (weight percent gain) is 7% or greater, and preferably 7~18%; and binding the resultant acetylated wood elements, using a binder containing polyisocyanate.

In addition, in each of the aforementioned methods for manufacturing ligneous material, different types of the aforementioned wood elements may be bound together, using a binder containing polyisocyanate, and laminated in a multi-layer structure comprising two or more layers.

DETAILED DESCRIPTION OF THE INVENTION

According to the present invention, at least one type of wood elements selected from among wood pieces crushed from lumber (hereinafter, referred to as wood pieces), thin wood plates peeled from lumber (hereinafter, referred to as thin wood plates), and wood fiber obtained by means of defibrating lumber (hereinafter, referred to as wood fiber), is used as wood elements. The ligneous material may comprise material from either needle-leaf trees or broad-leaf trees, and may be obtained from lumber such as aspen, radiata pine, lodge pole pine, cedar, maple trees, larch, abies, Japanese spruce, and the like.

Examples of the wood pieces may include material obtained by means of processing the aforementioned lumber into chips, using a chipper, crushing them, using a hammer mill, and the like, and screening them out. Preferred examples of the non-acetylated or acetylated wood pieces may include those with a width of 1 to 5 mm, length of 5 to 30 mm, and thickness of 0.1 to 3 mm.

Examples of the thin wood plate may include wood plates obtained by means of peeling the lumber into thin peels, using a flaker, and the like. Preferred examples of the non-acetylated or acetylated thin wood plate may include material comprising a width of 1 to 50 mm, length of 5 to 35 mm, and thickness of 0.1 to 3.0 mm.

Figure 1:
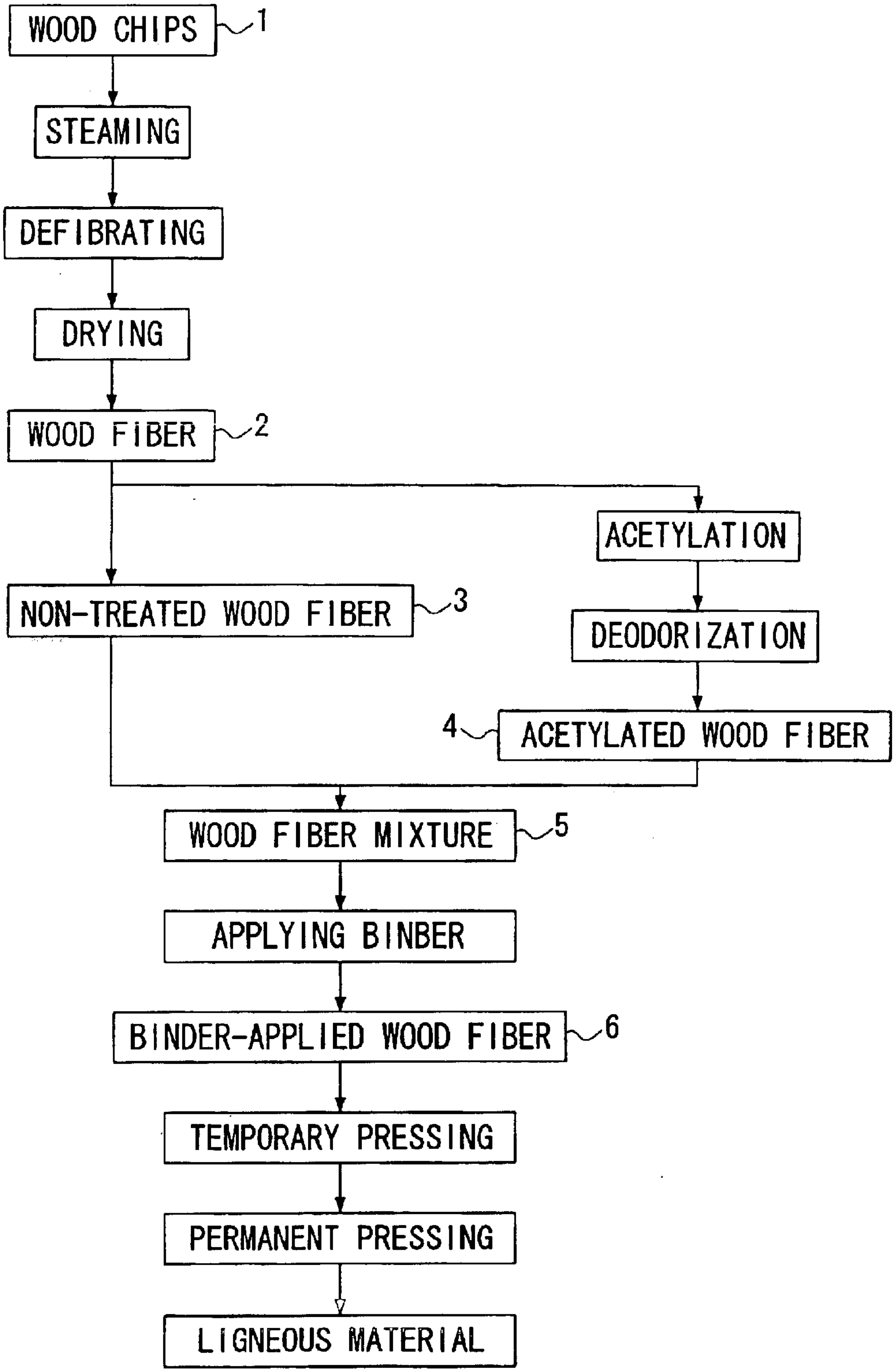
FIG. 1 is a diagram showing an example of a method for manufacturing ligneous material according to the present invention.

Examples of the wood fiber may include material obtained by means of processing the lumber into chips, and defibrating the obtained wood chip 1, as described in FIG. 1. A method wherein the chips are steamed under high-pressure steam, and defibrated using a disc refiner, is employed for defibrating the lumber. Preferred examples of the non-acetylated or acetylated wood fiber may include material comprising a diameter of 0.1 to 1.0 mm, and length of 0.2 to 50 mm.

The aforementioned wood elements is acetylated to yield an acetylated wood elements. Examples of the acetylated wood elements may include material obtained by means of bringing a non-acetylated wood elements into contact with the vaporized gas of an acetylating agent in the gas phase, such that a portion of the hydroxyl groups (OH) in the ligneous material is replaced with acetyl groups ($OCOCH_3$), as shown in the following formula.

$$[W]—OH+(CH_3CO)_2O \rightarrow [W]—OCOCH_3+CH_3COOH$$

Preferred examples of the aforementioned acetylating agent may include acetic anhydride. Additionally, the degree of acetylation of the acetylated wood elements (weight percent gain) is 7% or greater, and preferably 7 to 18%, and more preferably 9 to 18%. Acetylation may be performed either in the gas phase or liquid phase.

The degree of acetylation represents the percent weight gain, i.e., $(w-w_0)\times100/w_0$ (% by weight), with the provision that '$w_0$' represents the weight of the wood elements prior to acetylation; and 'w' represents the weight of the wood elements after acetylation.

Examples of the method for acetylation in the gas phase may include a method wherein the bottom of a reaction container is filled with the acetylating agent, over which a net made of stainless wire is placed. The wood elements is then placed onto the net and the acetylating agent is heated to generate steam in order to bring the wood elements into contact with the steam of the acetylating agent, and the like. The duration of the reaction changes according to the reaction temperature, and is shorter as the temperature is increased; however, the aforementioned duration of the reaction is preferably in the approximate range of 5 to 60 minutes. The duration of the reaction can be appropriately changed according to the degree of acetylation. Additionally, the reaction temperature is preferably in the approximate range of 140 to 200° C., and the reaction pressure is preferably normal pressure.

In the acetylation of the wood elements, the acetylating agent such as acetic anhydride may be diluted using xylene, and used.

The wood elements used for acetylation is preferably dried, in advance, such that the moisture content is 1% by weight or less. If the moisture content exceeds 1% by weight, the vapor of the acetic anhydride of the acetylating agent reacts with the moisture prior to reacting with the ligneous material, thus lowering the acetylation efficiency.

Examples of the binder for binding the wood elements include a resin containing polyisocyanate. Polyisocyanate is a chemical compound comprising two or more isocyanate groups per molecule. Examples of the polyisocyanate may include diisocyanate compounds such as 4,4'-diphenylmethane diisocyanate (MDI), and the like; a reactant product containing an excess amount of diisocyanate compounds and polyol, i.e., a compound comprising two or more hydroxyl groups per molecule, (examples of which include an adduct wherein 3 mol of trylenediisocyanate is added to 1 mol of trimethylol propane); and a polymeric MDI. Preferred examples of the polyisocyanate may include polymeric MDI (also known as crude MDL and referred to as PMDL hereinafter), that is, a polymer of 4,4'-diphenylmethane diisocyanate. Polyisocyanate such as PMDI, and the like, react with the moisture and the like in the wood elements to yield a hardened product (i.e., polyurethane resin), and also exhibits foaming properties as a result of reaction to moisture.

Examples of the binder may include those wherein polyisocyanate is mixed with a thermosetting resin such as melamine resin, melamine-urea cocondensation resin, phenol resin, urea resin, epoxy resin, and the like. A polyisocyanate content of 50% by weight or greater in the total amount of the binder (solid content), or 70% by weight or greater in particular, leads to the release of only a small amount of formaldehyde from the wood, and improved dynamic performance such as bending strength, and is thus desired.

An expandable resin may be added to the binder. Examples of the expandable resin may include expandable urethane resin, expandable phenol resin, and expandable melamine resin. Additionally, the expandable resin may comprise a non-expandable resin and foaming agent. Examples of the non-expandable resin may include melamine, melamine-urea co-condensation resin, urea, phenol resin, and the like, and mixtures thereof. Examples of the foaming agent may include volatile foaming agents such as $CCl_3F$, $CCl_2F—CClF_2$, and the like; thermal cracking foaming agent such as azodicarbonamide, 2,2'-azoisobutyronitrile, and the like.

The method for manufacturing ligneous material according to the present invention is a method wherein the entire wood elements is acetylated such that the degree of acetylation (weight percent gain) is 7% or greater, and preferably 7 to 18%, to yield an acetylated wood elements, which is then bound, using a binder containing polyisocyanate. Accordingly, the ligneous material manufactured according to the method of the present invention possesses a structure wherein the acetylated wood elements comprising a degree of acetylation of 7% or greater, and preferably 7 to 18% is bound by means of a polyisocyanate hardened product. The acetylated wood elements is preferably mixed at approximately 80% by weight or greater into the total amount of the acetylated wood elements and polyisocyanate hardened product, and more preferably at least 85% by weight and no greater than 95% by weight, in particular.

Additionally, the method for manufacturing ligneous materials according to the present invention is a method comprising the steps of acetylating a portion of the wood elements while preserving the remaining portion, (referred to as non-treated wood elements), wherein both are mixed such that the average degree of acetylation of the entire wood elements (weight percent gain) is 7% or greater, and preferably 7 to 18%, and subsequently bound together,:using a binder containing polyisocyanate.

The aforementioned ligneous material is manufactured by means of binding the acetylated wood elements solely, or a mixture of the non-treated wood elements and acetylated wood elements, such that the average degree of acetylation (weight percent gain) is 7% or greater, and preferably 7 to 18%, using a binder containing polyisocyanate. The ligneous material obtained according to the latter method possesses a structure wherein the non-treated wood elements and acetylated wood elements are randomly present in the ligneous material such that the average degree of acetylation (weight percent gain) is 7% or greater, and preferably 7 to 18% ; and the aforementioned non-treated wood elements and acetylated wood elements are bound together, using a polyisocyanate hardened product. The acetylated wood elements is preferably mixed in an amount of 50% by weight or greater in the total amount of the non-treated wood elements and acetylated wood elements. The total amount of the non-treated wood elements and acetylated wood elements preferably comprises at least 80% by weight of the total amount of the non-treated wood elements, acetylated wood elements, and a polyisocyanate hardened product, and more preferably, at least 85% by weight and no greater than 95% by weight.

Instead of a mixture of the nontreated wood elements and acetylated wood elements, a mixture of a first acetylated wood elements, of which degree of acetylation (weight percent gain) is 7% or greater, and a second acetylated wood elements, of which degree of acetylation is different from the first acetylated wood elements, may be used. An average degree of acetylation of said mixture (weight percent gain) is preferably 7% or greater, more preferably 7 to 18%.

A binder content of less than 5% by weight leads to a higher likelihood of insufficient adhesion of the wood elements; and a binder content exceeding 20% by weight leads to excessive amounts of the binder, which is uneconomical.

Furthermore, the average degree of acetylation is defined as $A \times B/100$ (% by weight). Provided that 'A' represents the degree of acetylation of the acetylated wood elements; and 'B' represents the % by weight of the acetylated wood elements within the total amount of the non-treated wood elements and acetylated wood elements.

A hardening agent, hardening catalyst, hardening accelerator, diluent, thickener, adhesive, dispersing agent, water repellent agent, and the like, may be added to the aforementioned binder as necessary.

Examples of the method for applying a binder containing polyisocyanate to the wood element without a hinder (which moisture content is preferably 1 to 15% by weight) may include a method in which the aforementioned is applied by means of spraying. Concrete examples include a method wherein the wood elements is placed into a drum rotating at a low speed (e.g., blender), while a binder resin is sprayed as the wood elements naturally drops in the rotating drum.

A binder-applied material to which the binder is applied, is molded under heat and pressure, and accumulated to yield the ligneous material. Examples of the method for molding under heat and pressure may include a method wherein the wood elements is temporarily pressed at a room temperature, and then permanently pressed under heat and pressure.

The temperature at the time of molding is preferably 140 to 210° C., when, for example, using PMDL Additionally, the pressure at the time of molding is not particularly limited, however, preferably comprises an approximate range of 15 to 30 kgf/cm$^2$, for example. Furthermore, the duration of molding is preferably in the approximate range of 5 to 30 seconds, for example, per 1 mm of the thickness of the product after molding.

Flame retardant, coloring agent, insecticide, antiseptic, anti-fungal agent, water repellent agent, acoustic material, foaming beads, filler, reinforcer, or the like, may be added, in advance, to the wood elements or binder resin, so as to be contained in the ligneous material.

The density of the ligneous material is determined according to the use of the ligneous material, and the like, however, is preferably 0.40 to 0.90 g/cm$^3$, and more preferably in the range of 0.60 to 0.80 g/cm$^3$, for example.

EXAMPLES

In the following, the present invention is described using examples for better understanding. In the following examples and comparative examples, 'part' represents part in weight; and '%' represents % by weight.

Example 1

Lumber was processed into chips, using a chipper, and the resultant chips were defibrated to yield wood fiber (F-4-17, manufactured by Canfor in Canada) as a wood elements. The aforementioned wood fiber comprised a thickness of approximately 0.1 to 1.0 mm, and a length of approximately 2 to 35 mm. The wood fiber, which had not been acetylated, was then acetylated using acetic anhydride, by means of a gas-phase acetylation equipment. Subsequently, the non-reactant acetic anhydride was removed by means of air intake, to yield an acetylated wood fiber (i.e., acetylated ligneous material). The reaction temperature was set at 160° C., and the duration for acetylation was 9 minutes. The degree of acetylation of the obtained acetylated wood fiber showed 10% in percent weight gain (WPG) to the wood fiber.

Meanwhile, PMDI (Sumidur 44V-20, manufactured by Sumitomo Bayer Urethane) was prepared as a binder resin.

15 parts of the aforementioned PMDI were applied to 100 parts of the aforementioned acetylated wood fiber, to yield a PMDI-applied wood fiber. The PMDI-applied wood fiber was molded under thermal pressure for 1 minute at a temperature of 195° C., and pressure of 20 kgf/cm$^2$, in order to harden PMDI, to yield ligneous material (with a density of 0.79 g/cm$^3$, and thickness of 3.2 mn). The aforementioned ligneous material was manufactured by means of binding the acetylated wood fiber (with an degree of acetylation of 10%) using a PMDI hardened product (with an degree of acetylation of 13%), wherein the acetylated wood fiber accounted for 87% of the total amount of the acetylated wood fiber and PMDI hardened product (in absolute dry weight, hereinafter expressed in the same manner).

The density, bending strength, and the like, of the obtained ligneous material were measured. These results are shown in Table 1. Moreover, the density, and the like, shown in Table 1, are as follows.

The mixing ratio of the acetylated wood fiber: % by weight of the acetylated wood fiber in the total amount of the wood fiber The mixing ratio of the binder: % by weight of the PMDI in the total amount of the wood fiber and PMDI.

Except for linear expansion, testing methods are performed according to Japanese Industrial Standard (JIS) or Japanese Agricultural Standard (JAS).

Example 2

This is an example of manufacturing the ligneous material according to the manufacturing process described in FIG. 1.

The same wood fiber 2 as in Example 1 was prepared as a non-treated wood elements. This wood fiber 2 was designated, in its original state, as the non-treated ligneous material 3.

Meanwhile, the aforementioned wood fiber 2 was acetylated in the same manner as in Example 1, to yield an acetylated wood fiber 4 (i.e., acetylated wood elements). However, the duration for acetylation was 40 minutes, and the degree of acetylation of the resultant acetylated wood fiber was 20% in percent weight gain.

75 parts of the aforementioned acetylated wood fiber 4 and 25 parts of the aforementioned non-treated wood fiber 3 were mixed together using a mixer, to yield a wood fiber mixture 5. The average degree of acetylation of the wood fiber mixture 5 was 15%. Furthermore, 15 parts of the PMDL as in Example 1, were applied to 100 parts of the aforementioned wood fiber mixture 5, to yield a binder-applied wood fiber 6. Subsequently, the aforementioned binder-applied wood fiber 6 was molded under thermal pressure, as in Example 1, to yield ligneous material (with a density of 0.76 g/cm$^3$, and thickness of 3.2 mm). Subsequently, the density and the like, of the ligneous material were measured in the same manner as in Example 1. These results are shown in Table 1.

Example 3

The same ligneous material as in Example 1 was acetylated in the same manner as in Example 1, to prepare an acetylated wood fiber (i.e., acetylated wood elements). However, the duration for acetylation was 20 minutes, and the degree of acetylation of the obtained acetylated wood fiber was 18% in percent weight gain. Ligneous material (with a density of 0.78 g/cm$^3$, and thickness of 3.2 mm) was obtained in the same manner as in Example 1, with the exception of using this acetylated wood fiber instead of using the acetylated wood fiber in Example 1. Subsequently, the density and the like, were measured.

Comparative Examples 1 to 3

Comparative Example 1 is an example wherein ligneous material was manufactured in the same manner as in Example 1, with the exception of omitting the acetylation; and subsequently its density and the like were measured.

Comparative Example 2 is an example wherein ligneous material was manufactured in the same manner as in Example 1, with the exception of using the acetylated wood fiber, which was produced by means of acetylating the same wood fiber as in Example 1 (for 5 minutes, such that the degree of acetylation was 5%), instead of using the acetylated wood fiber in Example 1. Subsequently its density and the like were measured.

Comparative Example 3 is an example wherein ligneous material was manufactured in the same manner as in Example 1, with the exception of using the acetylated wood fiber, which was made by performing acetylation on the same wood fiber as in Example 1 (for 40 minutes, such that the degree of acetylating is 20%), instead of using the acetylated wood fiber in Example 1. Subsequently its density and the like were measured. The results of measurements of Comparative Examples 1 to 3 are also shown in Table 1.

In other words, a sole type (one type) of the wood elements such as wood pieces, thin wood plates, wood fiber, and the like, may be bound using a binder resin and molded, to yield a ligneous plate. Alternatively, a laminated product comprising multiple types of the aforementioned wood elements may be integrated using a binder resin and molded to yield a ligneous plate with a multi-layer structure. An example of manufacturing a ligneous plate with a multi-layer structure comprises a method for manufacturing a ligneous plate with a three-layer structure, wherein the acetylated wood fiber 4 layer, which is bound using a binder 8 containing polyisocyanate, is integratively laminated on each side of a layer in which the acetylated wood pieces 7

TABLE 1

| Testing method | | Ex. 1 | Ex. 2 | Ex. 3 | Comp. Ex. 1 | Comp. Ex. 2 | Comp. Ex. 3 |
|---|---|---|---|---|---|---|---|
| | Mixing ratio of acetylated wood fiber (wt %) | 100 | 75 | 100 | 0 | 100 | 100 |
| | Degree of acetylation of acetylated wood fiber (wt %) | 10 | 20 | 18 | — | 5 | 20 |
| | Average degree of acetylation of wood fiber (wt %) | — | 15 | — | — | — | — |
| | Type of binder | PMDI | PMDI | PMDI | PMDI | PMDI | PMDI |
| | Mixing ratio of binder (wt %) | 13 | 13 | 13 | 13 | 13 | 13 |
| JIS A5905 5.4 | Density (g/cm$^3$) | 0.79 | 0.76 | 0.78 | 0.77 | 0.79 | 0.85 |
| JIS A5905 5.7 | Bending strength MOR (kgf/cm$^2$) | 445.1 | 406.1 | 538.8 | 560.8 | 437.8 | 418.9 |
| JIS A5905 5.16 | Bending Young's modulus MOE (1000 kgf/cm$^2$) | 40.8 | 37.6 | 43.8 | 50.1 | 39.6 | 38.6 |
| JIS A5905 5.10 | Thickness swelling in water at 20° C. TS20 (%) | 7.5 | 5.0 | 4.8 | 12.9 | 10.1 | 2.7 |
| JAS type II | Thickness swelling in water at 70° C. TS70 (%) | 12.5 | 8.3 | 9.0 | 17.7 | 16.3 | 4.5 |
| 35° C., 95% RH, 7 days | Lenear expansion LE (%) | 0.20 | 0.17 | 0.26 | 0.36 | 0.21 | 0.20 |
| JIS A5905 5.15 | Release amount of formaldehyde (mg/l) | 0.15 | 0.06 | 0.03 | 0.35 | 0.31 | 0.03 |

It is clear from Table 1 that the moisture resistance, bending strength, and release amount of formaldehyde of the ligneous materials in Examples 1 to 3 are all in the appropriate ranges, compared to Comparative Examples 1 to 3, and show a superior balance in the product quality.

Figure 2:
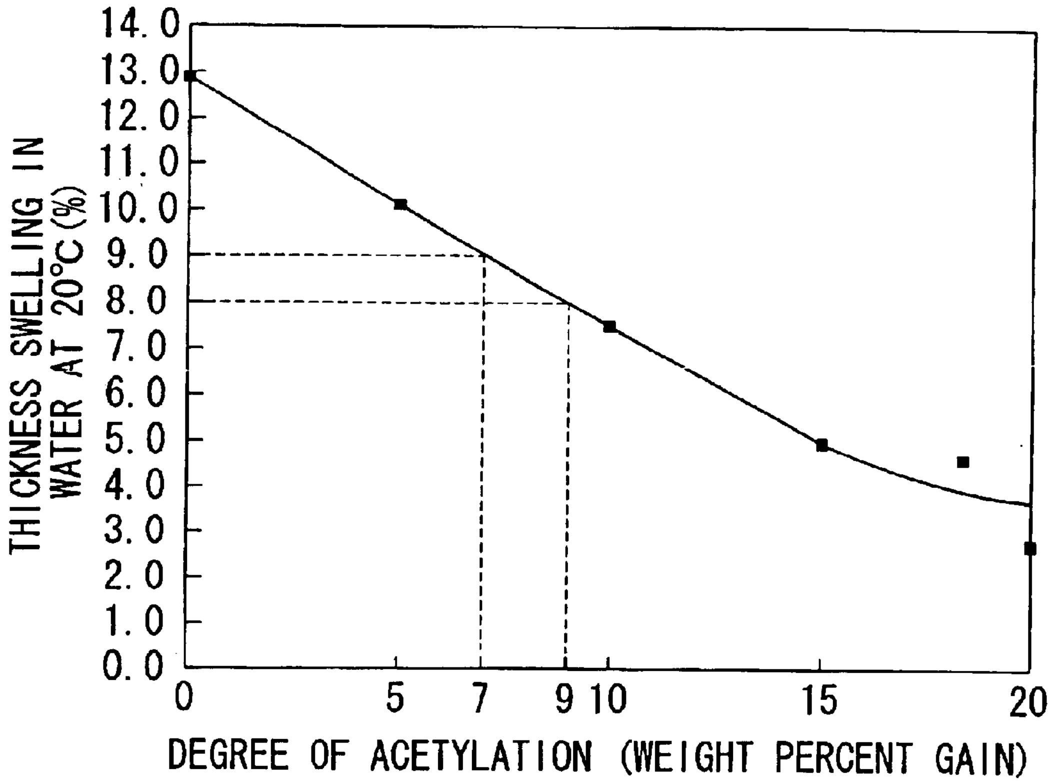
FIG. 2 is a graph exhibiting the relationship between the degree of acetylation and the amount of thickness thickness swelling in water.

It is clear from FIG. 2 that the degree of acetylation needs to be 7% or greater, in order to provide the effects of moisture resistance, measured as a thickness swelling in water at 20° C. (TS20) of 9.0% or smaller. Additionally, a degree of acetylation of 9% or greater leads to a thickness swelling in water at 20° C. (TS20) of 8.0% or smaller, as shown in FIG. 2, and is particularly preferred. An degree of acetylation of 18% or greater leads to a longer duration of acetylation, and an increased usage amount of the acetylating agent, and thus is not economical.

Additionally, it is clear from Table 1 that the release amount of formaldehyde is reduced by means of increasing the degree of acetylation; and the release amount is 0.3 gm/l or smaller when the degree of acetylation is 7% or greater. It is assumed that the formaldehyde released was originally contained in the wood fiber.

Figure 3:
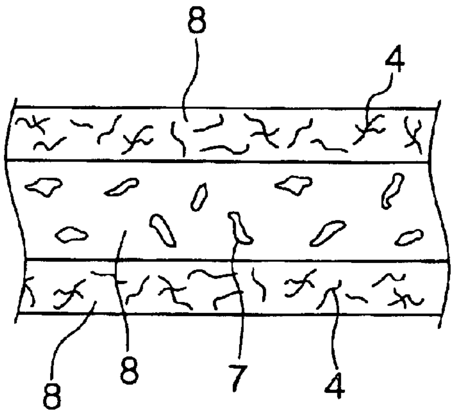
FIG. 3 is a diagram showing a cross-sectional view of an example of a ligneous plate comprising a multi-layer structure.

In the aforementioned examples, the ligneous material was molded using wood fiber as wood elements. However, a ligneous plate (i.e., ligneous material) may be molded, using a thin wood plate instead of the aforementioned wood fiber. Alternatively, a particle board may be molded, using wood pieces instead of the aforementioned wood fiber. Alternatively, a ligneous plate may be molded by means of alternately laminating wood elements such as wood fiber and thin wood plates and the like. In this case, wood fiber, wood elements, and the like, which compose the ligneous plate, may be changed according to the desired performance.

are bound using the binder 8 containing polyiscoyanate, as shown in FIG. 3.

As described in the aforementioned, according to the present invention, it is possible to provide an inexpensive ligneous material which exhibits only small dimensional change from moisture, and displays superior mechanical properties such as bending strength, and the like, while releasing only a small amount of formaldehyde. Such ligneous material is useful for building boards such as flooring material, wall material, and the like.

What is claimed is:

1. A method for manufacturing ligneous material, the method comprising:

preparing first wood fibers which are acetylated with a first degree of acetylation, and second wood fibers which are not acetylated, wherein said first degree of acetylation measured in weight percent gain is 7% or greater; and binding a first amount of said first wood fibers and a second amount of said second wood fibers with a binder to form a composite, wherein said binder comprises polyisocyanate and a thermosetting resin, the content of said polyisocyanate is 50% by weight or greater with respect to the a amount of said binder, and wherein the average degree of acetylation measured in weight percent gain of said composite is 7 to 18%, and wherein said first wood fibers have a diameter of 0.1 to 1.0 mm.

2. The method for manufacturing ligneous material according to claim 1, wherein said first wood fibers are acetylated by placing wood fibers in a gas or liquid which contains acetyl groups.

3. The method for manufacturing ligneous material according to claim 1, wherein said first amount is 50% by weight or greater of the total amount of said first and second wood fibers and said second amount is less than 50% by weight of the total amount of said first and second wood fibers.

4. The method for manufacturing ligneous material according to claim 1, wherein said binder contains polymeric 4,4-diphenylmethane diisocyanate.

5. The method for manufacturing ligneous material according to claim 1, wherein said first wood fibers arc produced by defibrating wood chips.

* * * * *